(12) United States Patent
Nakashima

(10) Patent No.: US 6,238,712 B1
(45) Date of Patent: May 29, 2001

(54) METHOD FOR PRODUCING AN AGED TEA MATERIAL AND METHOD FOR PRODUCING A TEA BEVERAGE

(75) Inventor: Yoshihiko Nakashima, Sasebo (JP)

(73) Assignee: Kabushiki Kaisha Ariake Nori, Tokyo (JP)

( * ) Notice: Subject to any disclaimer, the term of this patent is extended or adjusted under 35 U.S.C. 154(b) by 0 days.

(21) Appl. No.: 09/415,877

(22) Filed: Oct. 8, 1999

(51) Int. Cl.⁷ ................................. A23F 3/00; A23F 3/10
(52) U.S. Cl. ........................ 426/49; 426/580; 426/587; 426/590; 426/592; 426/597
(58) Field of Search .......................... 926/49, 590, 592, 926/597, 580, 587

(56) References Cited

FOREIGN PATENT DOCUMENTS 59-98652 * 6/1984 (JP).
11-127838 * 5/1999 (JP).

OTHER PUBLICATIONS

Database abstract. Derwent Acc No: 1983–75183 for SU 969236 Mar. 5, 1983.*

* cited by examiner

Primary Examiner—Anthony J. Weier
(74) Attorney, Agent, or Firm—Frishauf, Holtz, Goodman, Langer & Chick, P.C.

(57) ABSTRACT

A method for producing an aged tea material, which includes mixing an alcoholic beverage and a lactic acid-fermented material with a tea material for drinking, swelling the tea material for drinking, and then aging the tea material for drinking; and a method for producing a tea beverage, which includes adding water to the aged tea material as produced above, and extracting water-soluble components.

17 Claims, No Drawings

METHOD FOR PRODUCING AN AGED TEA MATERIAL AND METHOD FOR PRODUCING A TEA BEVERAGE

BACKGROUND OF THE INVENTION

The present invention relates to methods for producing an aged or matured tea material and a tea beverage which have an improved flavor and leave a pleasant aftertaste, by treating a tea material for drinking by a specific process.

Tea is a luxury beverage made from young buds and young leaves of tea plants as evergreen shrubberies of Camellia sinensis, and is roughly classified into three types of an unfermented tea, a fermented tea and a semi-fermented tea. These tea materials are classified on the basis of the difference in the production processes, and will be briefly explained below. The unfermented tea is the one obtained by, immediately after plucking leaves, heating the leaves to inactivate enzymes, followed by drying so as to keep the green color and develop the flavor and taste, i.e. the one made by a process not including a fermentation step. Green tea belongs to this group. The fermented tea is the one obtained by rolling or crumpling thoroughly the plucked leaves, and conducting oxidation with oxidases in the leaves, fermentation and drying, i.e. the one made by a process including a fermentation step. Black tea belongs to this group. Further, the semi-fermented tea is the one obtained by stopping the fermentation step on the way in the above production process of the fermented tea, followed by drying for finishing. Chinese teas such as oolong tea belong to this group.

Further, in addition to the above tea material for drinking made from the young buds and young leaves of tea plants, other tea materials for drinking made from plants other than evergreen shrubberies of Camellia sinensis, have been known, for example, barley tea (barley water or ptisan: the one obtained by roasting barley as covered with husks and finishing) and herb tea (the one obtained by drying fragrant grass leaves, stalks, seeds, etc.).

The tea materials for drinking and the tea beverages obtainable from such tea materials for drinking as mentioned above, are liked by people in many countries, and their consumption is substantial. Various processes and machines have been devised to make these tea beverages more tastily. However, the main stream is directed to a process for optimizing the conditions in extracting or steeping water-soluble components from the tea materials for drinking to produce good flavor. However, the flavor of conventional tea materials for drinking depends on the quality of young buds, young leaves, etc. of tea plants as the starting material, and after all, tasty teas tend to be expensive because high quality tea materials are used. For example, it is commonly known that Shincha (the first tea of the season or newly picked tea) is better than Bancha (coarse tea) in flavor, but the Shincha is substantially expensive as compared with the Bancha.

Further, in recent years, many types of canned beverages have been commercially available by vending machines or the like. However, since the canned beverages are subjected to high temperature sterilization, there is a tendency that the flavor is substantially deteriorated, a so-called watery feeling is given, and the original flavor of the tea is lost.

Moreover, although various types of teas have been known as above, every type has its own flavor, and thus there is barely known teas liked by everyone, and teas have been selected by everyone's taste.

SUMMARY OF THE INVENTION

Accordingly, it is an object of the present invention to provide methods for producing an aged tea material and a tea beverage which are liked by everyone, have an improved flavor and leave a pleasant aftertaste.

In order to accomplish the above object, the first aspect of the present invention provides a method for producing an aged tea material, which comprises mixing an alcoholic beverage and a lactic acid-fermented material with a tea material for drinking, swelling the tea material for drinking, and then aging the tea material for drinking.

The tea material for drinking is preferably at least one selected from the group consisting of green tea, Chinese tea, black tea and barley tea. Further, proportions of the alcoholic beverage and the lactic acid-fermented material (hydrous state) to the tea material for drinking are preferably from 0.3 to 2 and from 0.05 to 0.5, respectively, to 1 of the tea material for drinking, by weight. Furthermore, the aging of the tea material for drinking is conducted by keeping the tea material for drinking at 0 to 100° C. for 4 hours to 40 days.

Another aspect of the present invention is to provide a method for producing a tea beverage, which comprises adding water to the aged tea material produced by the above method, and extracting water-soluble components.

A still further aspect of the present invention is to provide a method for producing a tea beverage, which comprises mixing plural different tea beverages produced by the above method.

According to the present invention, an aged tea material is produced by mixing an alcoholic beverage and a lactic acid-fermented material with a tea material for drinking, swelling the tea material for drinking, and then aging the tea material for drinking. By adding water to this aged tea to extract the water-soluble components, it is possible to obtain a tea beverage wherein the alcoholic beverage and the lactic acid-fermented material used for the aging hardly remain and which leaves a pleasant aftertaste and is rich full-flavored as compared with the conventional ones produced from tea materials.

Further, since the flavor is improved as above, even if the quality of the starting material of the tea material for drinking is not good or the extracted tea beverage is canned, products maintaining the original good flavor can be obtained. Furthermore, since it is rich full-flavored and leaves a pleasant aftertaste, it is possible to provide a tea beverage which meets everyones taste of modern people.

MODE FOR CARRYING OUT THE INVENTION

Hereinafter, the present invention will be described in further detail with reference to preferred embodiments. The tea material for drinking used in the present invention is not particularly limited. However, for example, green teas such as Maccha (powdered green tea), Gyokuro (a type of Sencha), Sencha (green tea of middle grade), Kamairicha (a tea roasted in a pot), Bancha (coarse tea) and Houjicha (toasted or roasted tea); Chinese teas such as oolong tea, tie guanyin tea, pu-erh tea, huang shau tea, longin tea and pouchong tea; black teas such as Darjeeling tea and Assam tea, as well as barley tea, herb tea, jasmine tea, etc. may be mentioned. Further, in the present invention, two or more of these tea materials for drinking may be mixed for use. In this instance, among the above tea materials for drinking, Gyokuro, Sencha, Bancha, oolong tea, tie guanyin tea, Darjeeling tea, Assam tea, barley tea, etc. are particularly preferred.

As the alcoholic beverage used in the present invention, sake, wine, whiskey, brandy, vodka, shao-hsing rice wine, shochu (white distilled liquor), etc. may be mentioned.

Further, the lactic acid-fermented material used in the present invention, means products in a semi-gelled state or a liquid state, obtained by fermenting a raw material containing milk contents with lactic acid bacteria. According to the standards of ingredients by the ordinance of the Ministry of Health and Welfare of Japan, these products are classified into three types, i.e. a fermented milk containing 8 wt % or more of a milk solid-not-fat, a lactic acid beverage of dairy products containing at least 3.0 wt % and less than 8.0 wt % of a milk solid-not-fat, and a lactic acid beverage of non-dairy products containing less than 3.0 wt % of a milk solid-not-fat. The fermented milk may include e.g., yogurt. The lactic acid beverage of dairy products is further classified into raw lactic acid beverage and pasteurized lactic acid beverage. As the raw lactic acid beverage, for example, "Yakult" (trade name, manufactured by Yakult Honsha Co., Ltd.), etc. have been known. As the pasteurized lactic acid beverage, for example, "Calpis" (trade name, manufactured by Calpis Food Industry Co.,Ltd.), etc. have been known.

The method for producing the aged tea material of the present invention will be described. At first, as the tea material for drinking, one or two or more selected from the above-mentioned ones are placed in a container, preferably a sealable container made of plastics or stainless steel, since it is intended to prevent the volatilization of alcohol contained in the alcoholic beverage, which spoils the effects of fermentation by the alcohol.

Then, one or two or more selected from the above-mentioned ones as the alcoholic beverage and one or two or more selected from the above-mentioned ones as the lactic acid-fermented material, are added and mixed to the tea material for drinking, at proportions by weight of from 0.3 to 2, preferably from 0.5 to 1 of the alcoholic beverage and from 0.05 to 0.5, preferably from 0.05 to 0.2 of the lactic acid-fermented material to 1 of the tea material for drinking, and then the tea material for drinking is swelled. In this instance, the alcoholic beverage and lactic acid-fermented material are represented by the weight of hydrates thereof. It is preferred that the tea material for drinking is in a damped state in the container, not in an immersed state with a liquid-state product of the alcoholic beverage and lactic acid-fermented material.

After swelling, the sealable container is capped and placed in, for example, a thermostat chamber, and aging is conducted at a constant temperature of from 0 to 100° C., preferably from 30 to 70° C., for from 4 hours to 40 days, preferably from 4 hours to 7 days. If the aging temperature is at about 5° C., the aging time may sometimes be from 30 to 40 days. However, if the aging time exceeds 40 days, nasty smell of aging will be generated, and if shorter than 4 hours, the flavor of the resultant aged tea material will be uneven, such being undesirable.

After the completion of aging as mentioned above, the aged tea material of the present invention in a damp state is taken out of the sealed container. The aged tea material may be packaged under sterilized condition as it is and commercially sold, or may be kept by cold storage or chilled storage. However, to this aged tea material, water, preferably heated water may subsequently be added to extract water-soluble components from the aged tea material, thereby producing a rich-flavored tea beverage. Further, by preparing various types of tea beverages different in flavor, produced by the above method, and blending them at appropriate proportions, tea beverages with flavors in great variety can be produced. It is also possible to produce carbonated drinks by injecting carbon dioxide gas under pressure into the tea beverage.

EXAMPLE 1

A mixture comprising 400 g of Sencha, 70 g of brandy, 130 g of shao-hsing rice wine and 100 g of yogurt, was placed in a sealable container of stainless steel, and aged at a temperature of 50° C. for 96 hours, and then the Sencha was taken out of the container. 50 Liters of heated water of 85° C. was added thereto, and water-soluble components were extracted to obtain a tea beverage.

EXAMPLE 2

A mixture comprising 100 g of Sencha, 100 g of oolong tea, 100 g of barley tea, 100 g of black tea, 150 g of whisky, 50 g of white wine, 50 g of Ginjyoshu (a type of sake) and 120 g of Calpis, was placed in a sealable container of stainless steel, and aged at a temperature of 80° C. for 72 hours, and then the Sencha was taken out of the container. 50 Liters of heated water of 85° C. was added thereto and water-soluble components were extracted to obtain a tea beverage.

Comparative Example 1

50 Liters of heated water of 85° C. was added to 400 g of Sencha, and water-soluble components were extracted to obtain a tea beverage.

Comparative Example 2

400 g of Sencha, 70 g of brandy, 130 g of shao-hsing rice wine and 100 g of yogurt were mixed, and then, without conducting an aging step, the Sencha was taken out. 50 Liters of heated water of 85° C. was added thereto and water-soluble components were extracted to obtain a tea beverage.

Comparative Example 3

A mixture comprising 400 g of Sencha, 70 g of brandy and 130 g of shao-hsing rice wine, was placed in a sealable container of stainless steel, and aged at a temperature of 50° C. for 96 hours, and then the Sencha was taken out of the container. 50 Liters of heated water of 85° C. was added thereto, and water-soluble components were extracted to obtain a tea beverage.

Test Example 1

With respect to the tea beverages obtained in Examples 1 and 2 and Comparative Examples 1 to 3, five panelists were asked to test them for organoleptic examination, with the standard of evaluation of 1: pleasant, 2: a little pleasant, 3: normal and 4: unpleasant. The results are shown in Table 1 by the average of marks of the panelists in the evaluation.

TABLE 1

|  | Charged materials | Fermentation | Evaluation |
| --- | --- | --- | --- |
| Ex.1 | Sencha, brandy, shao-hsing rice wine, yogurt | Conducted | 1 |
| Ex.2 | Sencha, oolong tea, barley tea, black tea, whisky, white wine, Ginjyoshu, Calpis | Conducted | 1 |
| Comp. Ex.1 | Sencha | None | 3 |
| Comp. Ex.2 | Sencha, brandy, shao-hsing rice wine, yogurt | None | 4 |
| Comp. Ex.3 | Sencha, brandy, shao-hsing rice wine | Conducted | 2 |

As is evident from the results of Table 1, a superior evaluation was given to the tea beverages obtained by using the aged tea materials in Examples 1 and 2, obtained by adding the alcoholic beverage and lactic acid-fermented material to Sencha and aging the Sencha.

EXAMPLE 3

The tea beverage obtained in Example 1 and the tea beverage obtained in Example 2 were mixed at a weight ratio of 3:7 to obtain a tea beverage.

Test Example 2

Respective tea beverages of Examples 1, 2 and 3 were tested by five panelists, and they were asked to rank the tea beverages in the order of preference. As a result, Example 3, Example 2 and Example 1 were ranked in the order of preference.

By blending plural tea beverages different in flavor, produced by the present invention, it is possible to obtain a tea beverage further liked by people.

As described above, according to the present invention, it is possible to obtain an aged tea material and a tea beverage which leave a pleasant aftertaste and are rich full-flavored and which are liked by everybody. Further, according to the present invention, even if the quality of the starting material for the tea material for drinking is not good or the extracted tea beverage is canned, products maintaining original good flavor can be obtained

What is claimed is:

1. A method for producing an aged tea material which comprises mixing an alcoholic beverage and a lactic acid-fermented material with a tea material for drinking, swelling the tea material for drinking, and then aging the mixture of the tea material for drinking, the alcoholic beverage and the lactic acid-fermented material.

2. The method for producing an aged tea material according to claim 1, wherein the tea material for drinking is at least one selected from the group consisting of green tea, Chinese tea, black tea and barley tea.

3. The method for producing an aged tea material according to claim 1, wherein proportions of the alcoholic beverage and the lactic acid-fermented material to the tea material for drinking are from 0.3 to 2 and from 0.05 to 0.5, respectively, to 1 of the tea material for drinking, by weight.

4. The method for producing an aged tea material according to claim 1, wherein the aging of the tea material for drinking is conducted by keeping the tea material for drinking at a temperature of from 0 to 100° C. for 4 hours to 40 days.

5. A method for producing a tea beverage, which comprises adding water to the aged tea material as defined in claim 1, and extracting water-soluble components.

6. A method for producing a tea beverage, which comprises mixing plural different types of tea beverages produced by the method as defined in claim 5.

7. The method for producing an aged tea material according to claim 1, wherein the tea material for drinking is at least one tea selected from the group consisting of Maccha, Gyokuro, Sencha, Kamairicha, Bancha, Houjicha, oolong tea, tie guanyin tea, pu-erh tea, huang Shau tea, longin tea, pouchong tea, Darjeeling tea, Assam tea, herb tea, barley tea and jasmine tea.

8. The method for producing an aged tea material according to claim 1, wherein the tea material for drinking is at least one tea selected from the group consisting of Gyokuro, Sencha, Bancha, oolong tea, tie guanyin tea, Darjeeling tea, Assam tea and barley tea.

9. The method for producing an aged tea material according to claim 8, wherein the alcoholic beverage is selected from the group consisting of sake, wine, whiskey, brandy, vodka, shao-hsing rice wine and shochu.

10. The method for producing an aged tea material according to claim 1, wherein proportions of the alcoholic beverage and the lactic acid-fermented material to the tea material for drinking are from 0.5 to 1 and from 0.05 to 0.2, respectively, to 1 of the tea material for drinking, by weight.

11. The material for producing an aged tea material according to claim 4, wherein the aging is conducted at a temperature of 30 to 70° C. for 4 hours to 7 days.

12. The method for producing an aged tea material according to claim 1, wherein the lactic acid-fermented material is a semi-gelled or liquid product obtained by fermenting a raw material containing a milk content with lactic acid bacteria.

13. The method for producing an aged tea material according to claim 1, wherein the lactic acid-fermented material is selected from the group consisting of (a) fermented milk containing 8 wt. % or more of non-fat milk solids, (b) a lactic acid beverage of a dairy product containing at least 3.0 wt. % and less than 8.0 wt. % of non-fat milk solids and (c) a lactic acid beverage of a non-dairy product containing less than 3.0 wt. % of non-fat milk solids.

14. The method for producing an aged tea material according to claim 1, wherein the lactic acid-fermented material comprises yogurt.

15. The method for producing an aged tea material according to claim 13, wherein the tea material is at least one tea selected from the group consisting of Gyokuro, Sencha, Bancha, oolong tea, tie guanyin tea, Darjeeling tea, Assam tea and barley tea.

16. The method for producing an aged tea product according to claim 15, wherein the alcoholic beverage is selected from the group consisting of sake, wine, whiskey, brandy, vodka, shao-hsing rice wine and shochu.

17. The method for producing an aged tea product according to claim 1, wherein the tea material comprises Sencha, the alcoholic beverage comprises brandy and shao-hsing rice wine and the lactic acid fermented material comprises yogurt.

* * * * *